(12) United States Patent
Monyak et al.

(10) Patent No.: US 7,600,543 B2
(45) Date of Patent: Oct. 13, 2009

(54) STUMP GRINDING DISK AND WEAR STRIPS THEREFOR

(75) Inventors: Kenneth Monyak, Abingdon, VA (US); James Paumier, Canton, OH (US)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

(21) Appl. No.: 11/485,354

(22) Filed: Jul. 13, 2006

(65) Prior Publication Data
US 2007/0034288 A1 Feb. 15, 2007

Related U.S. Application Data

(62) Division of application No. 11/199,264, filed on Aug. 9, 2005, now Pat. No. 7,100,651.

(51) Int. Cl.
*B27C 1/00* (2006.01)
*B27G 13/00* (2006.01)

(52) U.S. Cl. .................. 144/235; 241/300; 144/24.12; 144/218

(58) Field of Classification Search .......... 144/235, 144/24.12, 241, 334, 218; 241/294, 300; 407/33, 34, 46, 101; 37/301, 302; 299/78, 299/102; 125/15; 451/541, 542
See application file for complete search history.

(56) References Cited

U.S. PATENT DOCUMENTS

| | | | | |
|---|---|---|---|---|
| 2,781,176 A * | 2/1957 | Clark | ............ | 241/294 |
| 2,833,638 A * | 5/1958 | Owen | ............ | 428/559 |
| 2,857,111 A * | 10/1958 | Clark | ............ | 241/294 |
| 3,016,661 A * | 1/1962 | Nidlsen | ............ | 451/541 |
| 3,122,030 A * | 2/1964 | Metzger | ............ | 76/112 |
| 3,127,887 A * | 4/1964 | Metzger | ............ | 125/15 |
| 3,271,911 A * | 9/1966 | McKenna | ............ | 125/15 |
| 3,425,901 A * | 2/1969 | Koffskey, Jr. | ............ | 162/352 |
| 3,797,544 A | 3/1974 | Ver Ploeg | ............ | 144/235 |
| 3,800,891 A * | 4/1974 | White et al. | ............ | 175/374 |
| 3,882,594 A * | 5/1975 | Jackson et al. | ............ | 228/122.1 |
| 3,935,887 A | 2/1976 | Van Zante et al. | ............ | 144/235 |
| 4,531,349 A | 7/1985 | Ehrhart et al. | | |
| 4,848,683 A * | 7/1989 | Kawatsu | ............ | 241/294 |
| 4,930,487 A * | 6/1990 | Younger | ............ | 125/15 |
| 5,002,104 A | 3/1991 | Stewart | ............ | 144/230 |
| 5,129,296 A * | 7/1992 | Wayne | ............ | 83/19 |
| 5,427,186 A * | 6/1995 | Adrian et al. | ............ | 172/701.3 |
| 5,497,815 A | 3/1996 | Bowling | | |
| 5,836,525 A * | 11/1998 | Garnier et al. | ............ | 241/28 |
| 5,868,330 A * | 2/1999 | Dodd et al. | ............ | 241/296 |
| 6,086,003 A * | 7/2000 | Gunter et al. | ............ | 241/235 |

(Continued)

*Primary Examiner*—Bena Miller
(74) *Attorney, Agent, or Firm*—Drinker Biddle & Reath LLP

(57) ABSTRACT

A stump grinding disk includes a metallic wheel defining an axis of rotation and including a pair of side surfaces and a circumferential outer edge surface. The outer edge surface includes a plurality of circumferentially spaced recesses. Each recess extends axially completely through the disk. A plurality of side cutting elements are mounted on each side surface. A plurality of outer peripheral cutters are spaced circumferentially apart around the outer edge surface. Wear strips are mounted in respective recesses. Each wear strip includes a metal matrix in which hard particles are disposed. Each wear strip defines a radially inner surface affixed to the wheel, and a radially outer surface arranged substantially flush with adjacent portions of the outer edge surface.

10 Claims, 1 Drawing Sheet

U.S. PATENT DOCUMENTS

| | | |
|---|---|---|
| 6,382,277 B1 | 5/2002 | Paumier et al. |
| 6,523,767 B1 * | 2/2003 | Ramesohl .................. 241/293 |
| 6,546,977 B1 | 4/2003 | Monyak et al. |
| 6,848,485 B1 | 2/2005 | Paumier et al. |
| 7,000,859 B2 * | 2/2006 | Tuovinen ................... 241/294 |
| 7,198,209 B2 * | 4/2007 | Herbst ........................ 241/30 |
| 2002/0179759 A1 * | 12/2002 | Dillon ........................ 241/300 |

* cited by examiner

STUMP GRINDING DISK AND WEAR STRIPS THEREFOR

This is a divisional application of application Ser. No. 11/199,264, filed on Aug. 9, 2005 now U.S. Pat. No 7,100,651 which is incorporated by reference herein in its entirety.

BACKGROUND OF THE INVENTION

The present invention relates to stump cutter disks which comprise a wheel on which cutting elements are mounted that grind-up stumps as the wheel is driven, and in particular to wear strips mounted on the wheel to minimize abrasive wear.

A stump grinding disc 100 disclosed in U.S. Pat. No. 6,382,277, and depicted herein in FIG. 1, includes a metallic wheel 112 which defines an axis of rotation. The wheel has a pair of parallel side surfaces 114 intersected by the axis A, and an outer circumferential edge surface 116 defining a largest diameter of the disk. The side surfaces 114 are spaced axially apart by a distance which is much shorter than a maximum diameter of the disk. A plurality of side cutting elements 120 are mounted on each side surface, and a plurality of peripheral cutting elements 122 are mounted in recesses 124 formed in the circumferential edge surface 116.

Stump cutter disks experience wear on the outer circumferential edge surface 116 of the disk, especially in the case of larger disks turning at high rpm. As the disk is lowered into the ground to cut a root ball, the roots and surrounding ground and rocks wear on the edge surface. The disk material is quickly eroded and its diameter is reduced, requiring that the disk be repaired or replaced. Both of those options are expensive and time consuming. To repair the disk, hard face material in the form of weld wire or rod is deposited on the circumferential edge using a welding machine. That requires many man-hours, and the hard face material is expensive. The repair is temporary and must be replaced as the disk wears down again.

To replace the disk, it must be removed from the machine, and all of the cutters must be removed and re-attached to a new disk. Some machine designs require that the cutter shaft be removed in order to change the disk. That often requires that the shaft bearings be replaced, which is expensive.

One attempt made to extend the life of stump cutters involved manufacturing the disk from an abrasive resistant material or work-hardened steel. Those materials are expensive and are difficult to machine and penetrate in order to form holes for the cutters. Moreover, the wear resistance offered by such disks is minimal and not very cost effective. Therefore, it would be desirable to provide a more effective and economical way of minimizing the rate of wear of a disk's outer surface.

SUMMARY OF THE INVENTION

The present invention relates to a stump grinding disk which comprises a metallic wheel defining an axis of rotation and including a pair of side surfaces interconnected by the axis. A circumferential outer edge surface defines a largest diameter of the disk. The side surfaces are spaced axially apart by a distance substantially shorter than the maximum diameter. The outer edge surface includes a plurality of circumferentially spaced recesses. Each recess extends axially completely through the disk from one side surface to the other side surface. A plurality of outer peripheral cutters are spaced circumferentially apart around the outer edge surface. Wear strips are mounted in respective ones of the recesses between circumferentially adjacent outer peripheral cutters. Each wear strip includes a metal matrix in which hard particles are disposed. Each wear strip defines a radially inner surface affixed to the wheel, and a radially outer surface arranged substantially flush with adjacent portions of the outer edge surface.

BRIEF DESCRIPTION OF THE DRAWINGS

The objects and advantages of the invention will become apparent from the following detailed description of preferred embodiments thereof in connection with the accompanying drawings in which like numerals designate like elements.

DESCRIPTION OF A PREFERRED EMBODIMENT

Figure 1:
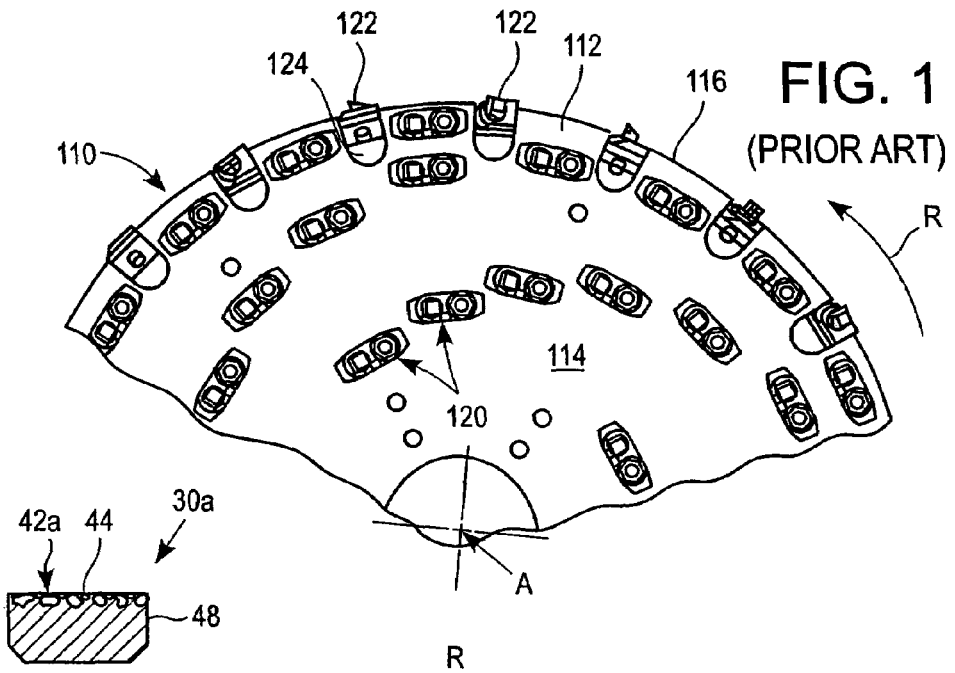
FIG. 1 is a fragmentary side elevational view of a prior art stump grinding disk.
Figure 2:
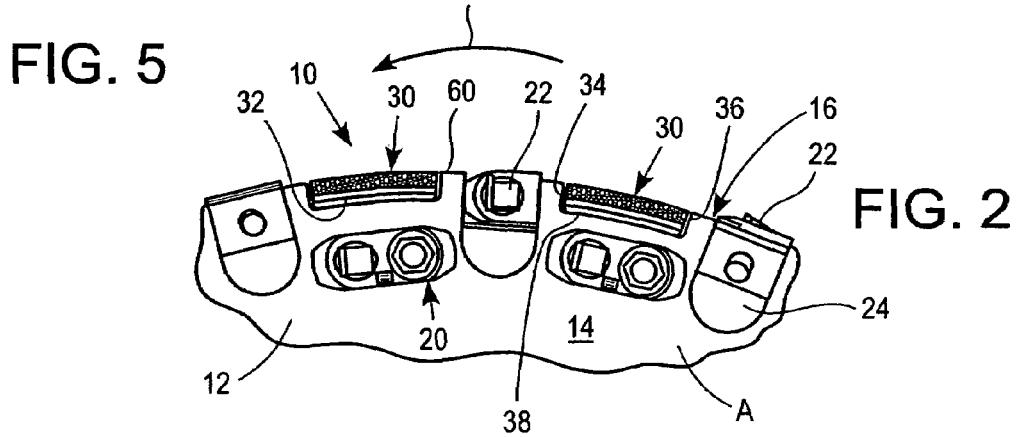
FIG. 2 is a fragmentary side elevational view of a stump grinding disk according to the present invention.

A stump grinding disk 10 according to the invention is depicted in FIG. 2. The disk includes a metallic wheel 12 which defines an axis of rotation. The wheel has a pair of side surfaces 14 intersected by the axis A, and an outer circumferential edge surface 16 defining a largest diameter of the disk. The side surfaces 14 are spaced axially apart by a distance which is much shorter than a maximum diameter of the disk.

A plurality of side cutting elements 20 are mounted on each side surface, and a plurality of peripheral cutting elements 22 are mounted in recesses 24 formed in the circumferential edge surface 16. Reference may be had to U.S. Pat. Nos. 6,546,977 and 6,848,485 for a description of examples of suitable side cutting elements and peripheral cutting elements, although other types of side and peripheral cutting elements could be used if desired. The disclosures of those patents are incorporated by reference herein.

Alternating with the peripheral cutting elements 22 are wear strips 30 according to the invention which are mounted in respective recesses 32 formed in the circumferential edge surface 16. The recess extends axially completely through the disk from one side surface 14 to the other. The recess 32 includes leading and trailing faces 34, 36 (considered with reference to the direction of disk rotation R) interconnected by a floor 38. Each wear strip includes an inner surface 40 (see FIG. 3) attached to the wheel 12, and an outer wear surface 42.

Figure 3:
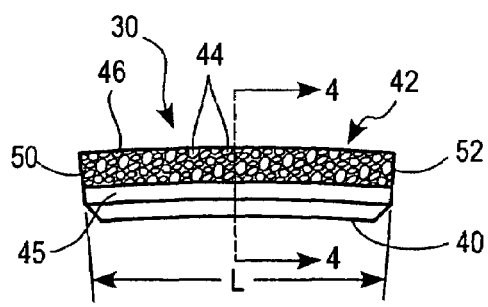
FIG. 3 is a side elevational view of a wear strip according to the present invention.
Figure 4:
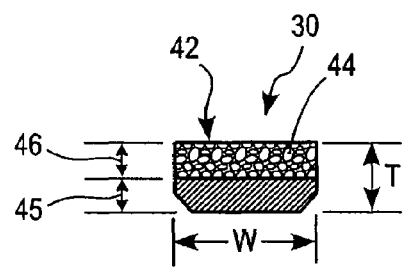
FIG. 4 is a sectional view taken along the line 4-4 in FIG. 3.

For example, as shown in FIGS. 3 and 4, the wear strip 30 could include a metallic mounting substrate 45 formed of steel for example, and a wear layer 46 formed of a mixture of a powdered steel matrix in which crushed carbide, e.g., crushed cemented carbide particles 44 are dispersed. The steel carbide mixture would be deposited onto the metallic substrate 45 and then the entire element would be forged and then immediately quenched.

Figure 5:
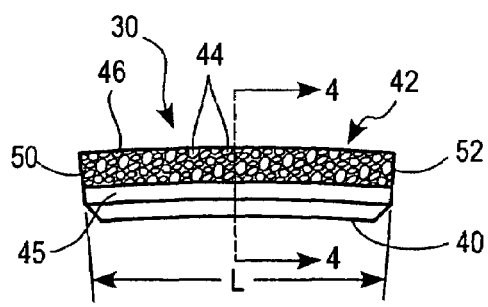
FIG. 5 is a view similar to FIG. 4 of a second embodiment of the invention.

Alternatively, a wear strip 30a could be formed by casting crushed cemented carbide particles 44 directly into an outer wear surface 42a of a steel or iron matrix 48 as shown in FIG. 5.

The outer wear surface 42 or 42a is preferably convexly curved along a length L of the wear strip, i.e., between leading and trailing ends 50, 52 of the wear strip, wherein the radius of curvature of the wear surface is substantially equal to the radius of curvature of the circumferential edge surface 16. The inner surface 40 would be shaped in accordance with the shape of the floor 38 of the recess 32. Thus, the inner surface 40 could be flat or concavely curved, for example. The length L is greater than a width W of the wear strip, and the width W is greater than a thickness T of the wear strip.

The wear strips are mounted in the recesses in any suitable fashion, but preferably by welding the metallic mounting substrate to the wheel, e.g., welding the wear strip to the floor 38 of the respective recess 32, with the wear surface arranged substantially flush with the adjacent portions of the circumferential edge surface 16 as depicted in FIG. 2. The total circumferential length of all of the wear surfaces of the wear strips (i.e., L×no. of wear strips) exceeds the total circumferential length of the non-recessed portions 60 of the circumferential edge surface disposed ahead of, and behind, the wear strips, so that a majority of the outer edge surface is defined by the wear strips.

During a stump cutting operation, the crushed cemented carbide 44 comes into contact with the ground and rocks, resisting wear and abrasion, and thereby extending the life of the disk. Once the wear strips have become excessively worn, they can be removed and replaced with fresh wear strips. Accordingly, the present invention enables the life of a stump cutting disk to be considerably lengthened.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. A wear strip for a peripherally mounted cutting element of a stump grinding wheel, comprising a metal matrix in which hard particles comprising crushed cemented carbide are embedded; a wear surface of the wear strip being convexly curved along a length of the wear strip, the length being greater than a width of the wear strip; and the width being greater than a thickness of the wear strip, wherein the wear surface includes the hard particles and an interior portion of the metal matrix is free of the hard particles.

2. The wear strip according to claim 1 comprising a metal layer in which the hard particles are embedded.

3. The wear strip according to claim 1, wherein the metal matrix is steel.

4. The wear strip according to claim 1, wherein the metal matrix is iron.

5. The wear strip according to claim 1, wherein the metal matrix is powdered steel.

6. A wear strip for use in a stump grinding wheel, comprising:
   a metal matrix in which hard particles comprising crushed cemented carbide are embedded; and
   a mounting substrate, the metal matrix with hard particles joined to the mounting substrate,
   wherein a wear surface of the wear strip is convexly curved along a length of the wear strip, the length being greater than a width of the wear strip and the width being greater than a thickness of the wear strip,
   wherein the thickness of the wear strip is perpendicular to the wear surface and traverses the metal matrix and the mounting substrate, and
   wherein the mounting substrate is metallic.

7. The wear strip according to claim 6, wherein the mounting substrate includes a flat or concavely curved mounting surface, the mounting surface on a side of the mounting substrate other than a side of the mounting surface to which the metal matrix with hard particles is joined.

8. The wear strip according to claim 6, wherein the metal matrix is steel.

9. The wear strip according to claim 6, wherein the metal matrix is iron.

10. The wear strip according to claim 6, wherein the metal matrix is powdered steel.

* * * * *